US008073879B2

(12) United States Patent  
Meijer et al.

(10) Patent No.: US 8,073,879 B2
(45) Date of Patent: Dec. 6, 2011

(54) SYSTEMS AND METHODS THAT TRANSFORM CONSTRUCTS FROM DOMAIN TO DOMAIN

(75) Inventors: Henricus Johannes Maria Meijer, Mercer Island, WA (US); Wolfram Schulte, Bellevue, WA (US); Oludare V. Obasanjo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1394 days.

(21) Appl. No.: 10/809,171

(22) Filed: Mar. 25, 2004

(65) Prior Publication Data

US 2005/0216508 A1  Sep. 29, 2005

(51) Int. Cl.
 *G06F 7/00* (2006.01)
 *G06F 17/30* (2006.01)
(52) U.S. Cl. ..................................... 707/809
(58) Field of Classification Search ............... 707/104.1, 707/999.101, 809
See application file for complete search history.

(56) References Cited

U.S. PATENT DOCUMENTS

| | | | | |
|---|---|---|---|---|
| 4,559,614 A | | 12/1985 | Peek et al. ............... | 718/100 |
| 6,125,391 A | * | 9/2000 | Meltzer et al. ........... | 709/223 |
| 6,504,554 B1 | | 1/2003 | Stone et al. .............. | 707/102 |
| 6,516,322 B1 | | 2/2003 | Meredith .................. | 715/760 |
| 6,631,497 B1 | | 10/2003 | Jamshidi et al. ......... | 715/514 |
| 6,643,633 B2 | | 11/2003 | Chau et al. ............... | 707/1 |
| 6,658,429 B2 | * | 12/2003 | Dorsett, Jr. .............. | 707/104.1 |
| 6,721,727 B2 | | 4/2004 | Chau et al. ............... | 707/3 |
| 7,194,485 B2 | * | 3/2007 | Kaipa et al. .............. | 1/1 |
| 2004/0039964 A1 | * | 2/2004 | Russell et al. ............ | 714/25 |
| 2005/0050068 A1 | * | 3/2005 | Vaschillo et al. ......... | 707/100 |
| 2005/0114394 A1 | * | 5/2005 | Kaipa et al. .............. | 707/104.1 |
| 2005/0160108 A1 | * | 7/2005 | Charlet et al. ............ | 707/101 |

OTHER PUBLICATIONS

E. Rahm and P.A. Bernstein. A Survey of Approaches to Automatic Schema Matching. The VLDB Journal, vol. 10 Issue 4, pp. 334-350, 2001.

A. Boukottaya, C. Vanoirbeek, F. Paganelli, and O.A. Khaled. Automating XML Documents Transformations: a Conceptual Modelling Based Approach. Proceedings of the 1st Asian-Pacific Conference on Conceptual Modelling—vol. 31, pp. 81-90, 2004.

* cited by examiner

*Primary Examiner* — Kimberly Lovel
(74) *Attorney, Agent, or Firm* — Workman Nydegger

(57) ABSTRACT

The present invention provides systems and methods that isomorphically maps constructs between domain spaces (e.g., object, markup, relational and user interface domains). The systems and methods employ a mapping component that utilizes at least one suppress label(s), introduce label(s) and/or mediating schema to facilitate construct mapping. Examples of such mapping include transforming a named construct to an anonymous construct, a named construct to a named construct, an anonymous construct to a named construct, and an anonymous construct to an anonymous construct. In general, introduce labels can be utilized to provide names for anonymous constructs and/or modify existing names; suppress labels typically are utilized to suppress names such as introduced names or names a user desires to be suppressed; and mediating schema can be utilized to provide a default or user customized mapping to an intermediate schema before, during and/or after construct mapping.

16 Claims, 11 Drawing Sheets

SYSTEMS AND METHODS THAT TRANSFORM CONSTRUCTS FROM DOMAIN TO DOMAIN

TECHNICAL FIELD

The present invention generally relates to data processing, and more particularly to systems and methods that employ suppress labels, introduce labels and/or mediating schema to map a construct from one domain to another domain.

BACKGROUND OF THE INVENTION

Applications commonly are built using object-oriented programming languages, wherein information is often modeled as domain objects. Such objects can be utilized to encapsulate information (e.g., business related), wherein various components can manipulate these objects during the process of implementing use cases. In many instances, it is desirable to build such applications such that the information is expressed in the form of markup language, such as XML (Extensible Markup Language) or SGML (Standard Generalized Markup Language) artifact, for example.

Today, there are a variety of technologies that generate XML artifacts from object code or instances of object code and process the XML artifacts. For example, standard APIs (Application Program Interfaces) such as SAX (Simple API for XML) and DOM (Document Object Model) are often employed. In addition, industry language standards such as XSL (Extensible Style Language) and XPath are commonly utilized. Furthermore, emerging technologies such as schema compilers and data binders, and homegrown XML programming APIs (which are often built on top of SAX and DOM) that simplify specific application needs are becoming more and more prevalent.

However, there often is a large impedance mismatch between the structure utilized to represent XML artifacts and objects. Thus, to enable programmers in the object world to work seamlessly in the XML world as if the XML representation were objects, this impedance mismatch must be resolved. One common technique utilized to bridge the gap is to employ a data-binding or mapping tool. Such tools typically provide some form of mapping between the XML and the object domains, or space. For example, given an XSD (XML Schema Definition) schema, a data binder can be utilized to serialize schema values to a type-declaration (e.g., class type) with corresponding field labels. In another example, a data binder can be utilized to generate the XSD schema from the type-declaration. This impedance mismatch is not limited to structural differences between XML and object domain representations. For example, this mismatch can be found between structures in relational, object, markup and/or user interface domains.

Because of the structure mismatch, suitable data-binding tools must provide users with at least some control over construct mappings. For example, the user may desire to utilize different field names for disparate domains, serialize particular fields to one or more attributes instead of child elements, prevent particular elements from being serialized, etc. Techniques to achieve such customization include annotating types and/or annotating schemas.

One particular difference between a markup language representation and an object-oriented representation that amplifies the structure mismatch is the fact that type-systems of mainstream object-oriented languages generally are nominal (named) types whereas many markup language constructs are anonymous constructs. Mapping between such different structures is not handled very well with conventional data-binding tools. For example, many conventional systems when generating objects from markup language interpret constraints for anonymous elements in the markup language representation as if the constraints were distributed over named child elements in the markup language representation. However, this interpretation can result in a completely different content model than what is intended by the original schema. Consequently, it might be impossible to ascertain whether the original schema was the anonymous schema with constraints for anonymous elements or whether the constraints were associated with the child elements. Thus, there is a need to provide more versatile data binding techniques that overcome the aforementioned shortcomings associated with conventional data binding systems.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that transform constructs. For example, the systems and methods can be utilized to transform a construct from one domain or space to a construct in another domain or space. For example, a construct in the object domain (e.g., an object oriented based artifact) can be mapped to a construct in the markup domain (e.g., a markup language based artifact) or vice versa. In another example, these constructs (object and/or markup) can be transformed to and/or from constructs in the user interface (UI) domain and/or relational domain. Moreover, such transformation can include one or more of the following mappings: transforming a named construct to an anonymous construct; transforming a named construct to a named construct; transforming an anonymous construct to a named construct; and transforming an anonymous construct to an anonymous construct.

The present invention employs at least one of a set(s) of suppress labels, a set(s) of introduce labels and a mediating schema(s) to facilitate construct transformations. In general, introduced field labels typically are utilized to provide names when mapping anonymous constructs to named constructs; however, they can additionally be utilized to modify existing names. Suppressed field labels typically are utilized to suppress names when mapping named constructs to anonymous constructs. For example, suppressed field labels can be employed to hide introduced names or names a user desires to be absent after a transformation. Mediating schema provide a technique to utilize a default or user customized mapping to an intermediate representation (e.g., schema) prior to transforming a construct to a desired domain representation. The foregoing can overcome the mismatch when binding named and/or anonymous constructs to named and/or anonymous constructs. Conventional data binding systems typically do not include a mechanism to explicitly control hide/introduce member names to bridge this domain related mismatch.

In one aspect of the present invention, a system that provides a mapping between constructs is illustrated. The system comprises a mapping component that transforms one construct to another construct. Such transformation can be a single transformation, wherein the resultant construct is output, or a plurality of transformations, wherein one or more intermediate and/or resultant constructs are output. Where more than one construct is output, such constructs can be similar (e.g., multiple object constructs) and/or different (e.g., at least one object construct and at least one schema construct). In addition, more than one user and/or application can concurrently utilize (e.g., via APIs) the system to transform constructs. The mapping components can introduce and/or suppress construct structure (e.g., before, during and/or after transformation) to facilitate transformation between various construct representations, wherein introduced and/or suppressed structure can be identified as such and removed and/or made visible in order to preserve the construct's original structure (e.g., isomorphic or lossless transformations). Examples of constructs that can be transformed in accordance with an aspect of the present invention include object, object instance, UI, and schema constructs.

In another aspect of the present invention, a configuration component is employed in connection with the mapping component. The configuration component can store mappings between constructs. Such mapping can include a set(s) of introduce field labels that can be utilized to render implicit information explicit; a set(s) of suppress field labels that can be utilized to hide information; and a mapping file(s) (e.g., default, user defined and intelligence based) that defines mappings between constructs. The mapping component can receive anonymous or named constructs, retrieve a suitable mapping(s) from the configuration component, and transform the received construct. Such mappings can be at least one of the following: from a named construct to a different named construct; from a named construct to an anonymous construct (e.g., similar and different); from an anonymous construct to a different anonymous construct; and from an anonymous construct to a named construct (e.g., similar and different). Suitable constructs can be represented in a markup language (e.g., XML and CLR), an object oriented language (e.g., Java, C++, C#, Visual Basic . . . ), a relational table(s), and/or a user interface, for example.

In other aspects of the invention, systems that transform constructs (e.g., anonymous and named) between markup space and object space are illustrated. In one instance, the system comprises a serializer that maps markup space constructs to object space constructs and a deserializer that maps object space constructs to markup space constructs. In another instance, the system comprises a persister that maps object space constructs to relational space constructs and a restorer that maps relational space constructs to object space constructs. In yet another instance, the system comprises a publisher that maps markup space constructs to relational space constructs and a shredder that maps relational space constructs to markup space constructs. In still another instance, the system comprises a binder that maps object, markup and/or relational space construct to user interfaces and user interfaces to object, markup and/or relational space constructs. Suitable mappings for the foregoing can be obtained from a configuration component and/or a mediating schema. The mediating schema can be employed to generate an intermediate structure(s) that facilitates construct transformations.

In still other aspects of the present invention, methodologies are provided that transform constructs. Such methodologies include techniques that serialize, deserialize, persists, restore, publish, shred and/or bind constructs.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
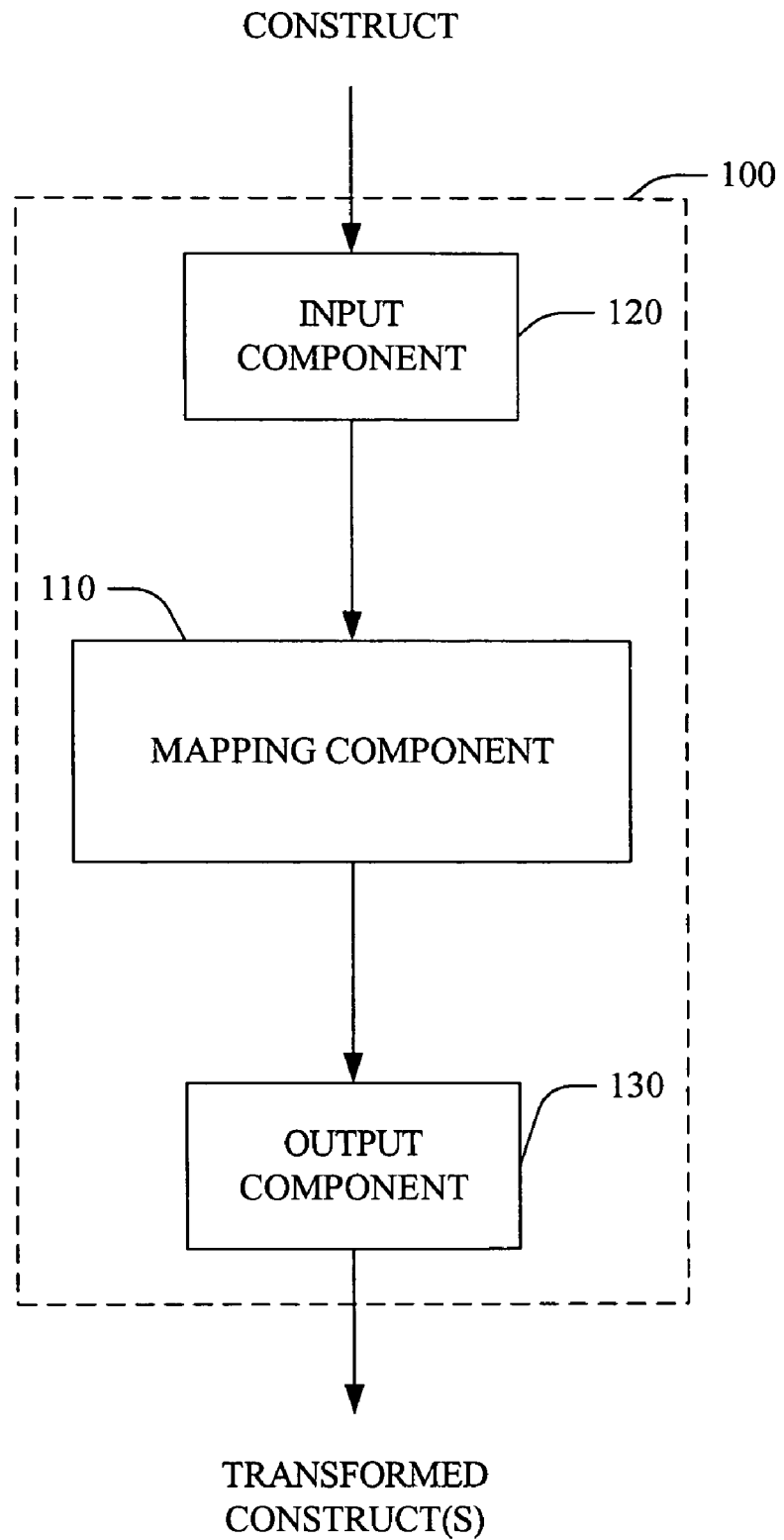
FIG. 1 illustrates an exemplary system that maps a construct to a different construct.

The present invention provides systems and methods that transform constructs between domains. In particular, a mapping component is provided that can obtain one or more suppress labels, introduce labels and/or mediating schema, and utilize such labels and/or schema to transform a construct from one domain to another domain. In general, introduce field labels typically are utilized to provide names for anonymous constructs and/or modify existing names, suppress field labels typically are utilized to suppress names such as introduced names or names a user desires to be absent, and mediating schema provide default and/or user defined customized mapping to generate an intermediate schema prior to transforming a construct. The foregoing can provide for improvements over conventional systems by overcoming structural mismatches between named and anonymous constructs and rendering isomorphic transformations.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

FIG. 1 illustrates a system 100 that maps constructs. The system 100 comprises a mapping component 110 the transforms one construct to another construct. The system 100 further comprises an input component 120 that receives constructs and conveys received constructs to the mapping component 110 and an output component 130 that receives and outputs transformed constructs.

The mapping component 110 can transform essentially any construct (e.g., structured data) from one structure to at least one different structure. When transforming the construct to more than one other construct, the construct can be concurrently transformed into disparate constructs and output via the output component 130. For example, an object construct can be received by the input component 120 and conveyed to the mapping component 110, wherein the object construct can be mapped to a schema construct, a relational construct and/or a user interface (UI) construct, disparate schema constructs, disparate relational constructs, disparate UI constructs, and/or other constructs. Generated constructs can be conveyed to the output component 130. It is to be appreciated that the foregoing transformation example does not limit the invention. For example, object, object instance, UI, relational tables, schema, etc. constructs can be transformed to and from one another, including disparate forms of the same construct (e.g., from one object construct to another object construct).

In many instances, an iterative approach can be employed, wherein a resultant construct can be cycled through the mapping component 110 multiple times until the desired construct is generated. By way of example, a first construct can be conveyed to the mapping component 110 by the input component 120, wherein the mapping component 110 transforms the first construct to a second construct. The second construct can be cycled back to the mapping component 110 and transformed to a third construct. The cycle can continue until a desired construct is generated, wherein any intermediate construct as well as the desired construct can be serially and/or concurrently output by the output component 130.

The mapping component 110 can introduce and/or suppress entities within a construct's structure to facilitate construct transformation. For example, a first construct can include indicia that is not utilized in a second construct. In these instances, the indicia can be suppressed and/or modified by the mapping component 110 before, during and/or after transforming to the second construct. In addition, such information, although suppressed in the second construct, can be hidden, but retained such that if the second construct is transformed back to the first construct, the original information can be preserved or if the second construct is transformed to a third construct, the original information can be suitably utilized (e.g., hidden, modified and visible).

In another example, the first construct may not include indicia required in the second construct. In these instances, such indicia can be introduced by the mapping component 110 before, during and/or after transforming the construct. Similar to suppressed indicia, introduced indicia can be identified from original structure. Thus, introduced indicia can be removed in order to preserve the original information and/or modified to comply with another construct. The foregoing provides for isomorphic (1:1 or lossless mapping) transformations, which can provide for improvements over conventional systems that commonly employ lossy techniques, wherein the original construct cannot be recovered back to its original form.

The input component 120 and the output component 130 provide suitable interfaces to interact with the mapping component 110. For example, the input component 120 and the output component 130 can be application program interfaces (API's), software drivers, communication protocols, routines, network interfaces, and/or bus interfaces. In addition, the input component 120 and output component 130 can be concurrently interfaced to disparate entities, wherein transformation of multiple constructs from multiple entities can be performed in parallel.

Figure 2:
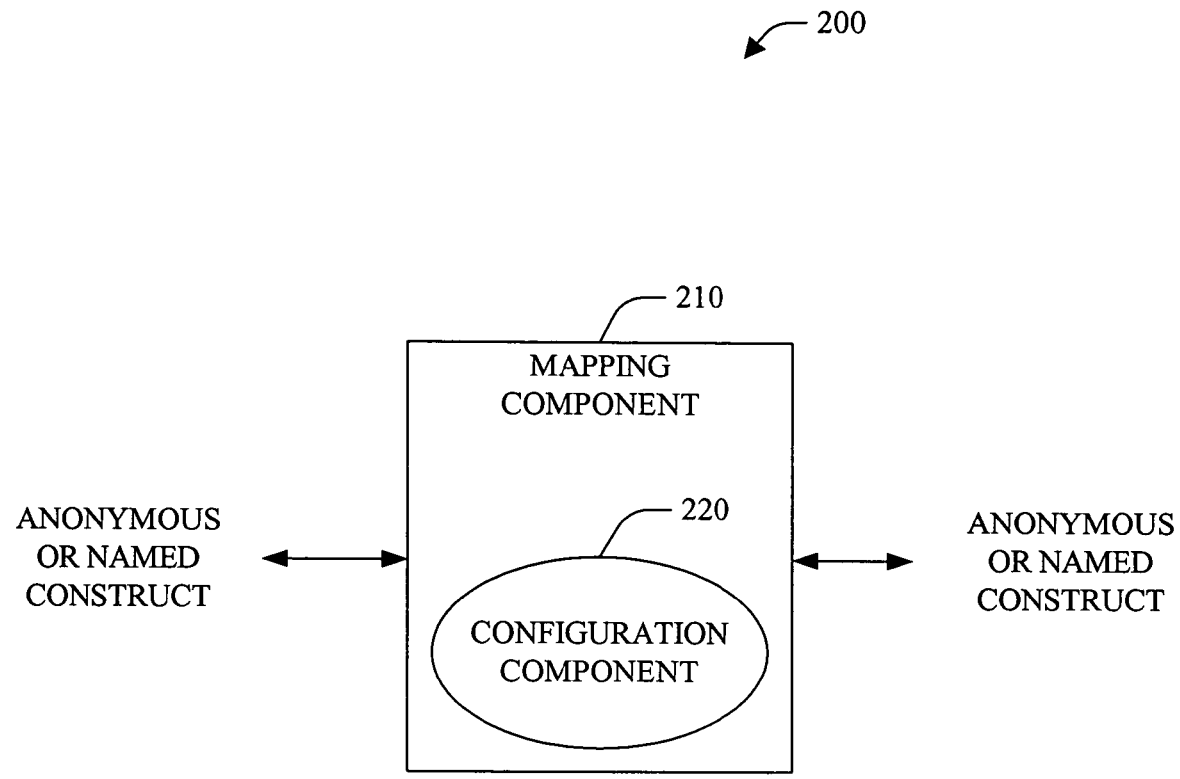
FIG. 2 illustrates an exemplary system that transforms anonymous and/or named constructs to anonymous and/or named constructs.

FIG. 2 illustrates a system 200 that transforms constructs. The system 200 comprises a mapping component 210 that can receive an anonymous or a named construct and map the received construct to a different anonymous or a named construct. For example, the mapping can be at least one of the following: from a named construct to a different named construct; from a named construct to an anonymous construct (e.g., similar and different); from an anonymous construct to a different anonymous construct; and from an anonymous construct to a named construct (e.g., similar and different). It is to be appreciated that such constructs (e.g., anonymous and named) can be represented in a markup language (e.g., XML and CLR), an object oriented language (e.g., Java, C++, C#, Visual Basic . . . ), a relational table(s) (e.g., SQL), and/or a user interface, for example, and that the original and transformed construct can be any combination of the foregoing construct examples, including disparate constructs. Thus, examples of construct mapping that can be employed in accordance with various aspects of the present invention include: serializing markup to objects; deserializing objects to markup; persisting objects to relational tables; restoring objects from relational tables; publishing markup in relational tables; shredding relational tables to markup; and/or binding objects, markup and/or relational tables with user interfaces.

The configuration component 220 can store mappings between constructs. Such mapping can include a set(s) of introduce field labels that can be utilized to render implicit information explicit. For example, an introduce field label can be utilized when mapping an anonymous construct to a named construct, wherein the introduce field label provides a name for one or more anonymous elements of the construct. Likewise, an introduce field label can be employed to provide a name for one or more elements of the anonymous construct when converting from an anonymous construct to a different anonymous construct. In addition, introduce field labels can be utilized with named constructs, for example, to override or modify a name, including changing a named element to an anonymous element (e.g., a null label).

The mapping can further include a set(s) of suppress field labels. Suppress field labels can be utilized suppress field labels. For example, when a construct is generated, an introduce field label, as described above, can be utilized to add, modify and/or remove a field label from the original construct. The set(s) of suppress field labels can be utilized to suppress the addition, modification and/or removal such that the construct can be returned to its original structure, if desired. In addition, a construct may include field labels that do not map to a desired construct. The suppress field labels can further be utilized to hide field labels so that the field labels are transparent in the transformed construct. Suppressed field labels can be unhidden when transforming the construct back to the original construct, to another construct, and/or if the field labels become mappable to the construct.

The mapping can further include a mapping file(s) (e.g., mapping schema) that defines the mapping from construct to construct. Such mapping file(s) can comprise a default mapping, a user defined mapping, and/or a mapping based on a heuristic, an inference, machine learning and/or a probability. The mapping file(s) can be pre-determined and/or dynamically generated and/or updated. For example, a history can be maintained and utilized to update inferences and probabilities and refine machine learning by employing the history as training data. Mappings within the mapping file(s) can include suppress and/or introduce field labels that can be utilized similar to that suppress and introduce field sets described above. Moreover, the mapping file(s) can include a mediating schema that facilitates transforming constructs. The mediating schema can render named constructs anonymous and/or make names explicit to anonymous constructs before, during and/or after transforming constructs. In addition, the mediating schema can be utilized to generate intermediate constructs that facilitate desired construct transformations.

The mapping component 210 can obtain and employ a suitable mapping from the configuration component 220. By way of example, when a construct is provided to the mapping component 210, a mapping from the configuration component 220 can be retrieved or generated and utilized to facilitate mapping the construct to one or more other constructs. The mapping can be retrieved based at least in part on the desired construct and, optionally, on intelligence. For example, the user can specify a desired construct, or the mapping component 210 can determine a desired construct, for example, based on the user, application, and/or previous construct transformation.

Figure 3:
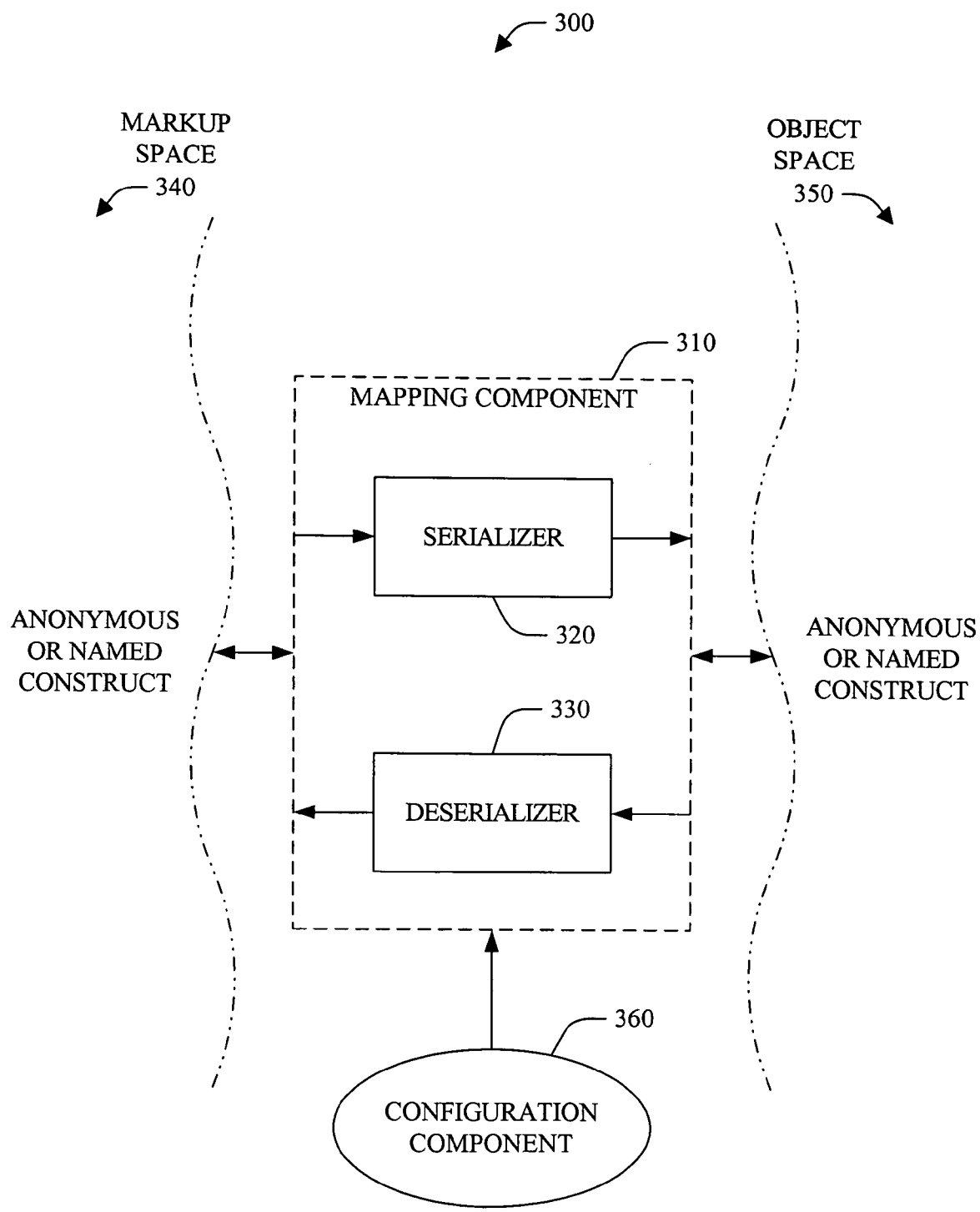
FIG. 3 illustrates an exemplary system that employs introduce and/or suppress field labels to transform constructs between markup space and object space.

FIG. 3 illustrates a system 300 that transforms constructs between markup space and object space. The system 300 comprises a mapping component 310, a serializer 320 and a deserializer 330. The serializer 320 typically is utilized to transform a markup space construct (e.g., anonymous and named) to an object space construct (e.g., anonymous and named) and the deserializer 330 typically is utilized to transform an object space construct (e.g., anonymous and named) to a markup space construct (e.g., anonymous and named). The following paragraphs provide exemplary transformation examples between markup and object space.

In one aspect of the present invention, the system 300 can be utilized to transform a named construct in markup space 340 (e.g., a markup language based construct) to a named construct in object space 350 (e.g., an object oriented language based construct). By way of example, the following exemplary named XSD schema:

```
<element name="Point">
    <complexType>
        <sequence>
            <element name="x" type="int"/>
            <element name="y" type="int"/>
        </sequence>
    </complexType>
</element>
``` can be received by the mapping component 310. The mapping component 310 can convey the XSD schema to the serializer 320. In order to transform this XSD schema to an object in object space 350, the serializer 320 can obtain a suitable mapping from the configuration component 360. Such mapping can include suppress field labels, introduce field labels and/or mapping files, as described in detail above. Once a suitable mapping is acquired, the serializer can utilize the mapping to transform the XSD construct to a corresponding type declaration (e.g., class) in object space 350. For example, the above XSD schema can be transformed to following named construct:

```
class Point {
    public int x;
    public int y;
}
``` in object space 350.

It is to be appreciated that such mapping can be 1:1, wherein the labels associated with the first construct are utilized in the transformed construct, as illustrated in the above example, or customized to selectively add, modify and/or remove construct structure. For example, as an alternative, the user can specify a desire to modify a name during the transformation from the markup domain to the object domain. For example, the user may desire to serialize "Point" in the markup construct illustrated above to "pair" in the object construct such that the above example renders the following construct:

```
class pair {
    public int x;
    public int y;
}
``` wherein the class name is "pair" rather than "Point." The mapping can alternatively be configured such that identified fields are serialized as attributes rather than child elements, for example, and/or particular fields are not serialized. It is to be understood that the foregoing examples are provided for explanatory purposes and do not limit the invention. In addition, any known technique to provide such customization can be utilized in accordance with the present invention and does not limit the invention.

In another aspect of the present invention, the system 300 can be utilized to transform an anonymous construct in markup space 340 (e.g., XML and CLR) to a named construct in object space 350 (e.g., a Java, C++, C#, Visual Basic and the like construct). In general, this scenario illustrates a large impedance mismatch between constructs in markup space 340 and constructs in object space 350. Basically, type-systems of mainstream object-oriented languages generally are named (nominal) types whereas markup language based constructs commonly are anonymous constructs. Thus, when transforming a construct from markup space 340 to object space 350, names typically need to be introduced to mitigate issues related to representing anonymous elements in a domain that requires names.

Similar to above, the serializer 320 can be utilized to transform constructs from markup space 340 to object space 350. By way of example, the following exemplary anonymous markup based construct:

```
<element name="A">
    <complexType>
        <sequence maxOccurs="unbounded">
            <element name="B" type="int"/>
            <element name="C" type="int"/>
        </sequence>
    </complexType>
</element>
``` where an anonymous "sequence" field is associated with an "unbounded" occurrence constraint can be received by the mapping component 310.

With conventional systems, this exemplary markup language can be handled in a manner similar to markup language representations where the occurrence constraint is distributed over the child elements of the sequence field. However, these two models describe completely different content models so introducing a new type can lead to an erroneous type. The present invention mitigates the foregoing by introducing a field label for the anonymous "sequence" field in order to generate a suitable object space construct. It is to be appreciated that this possible because the present invention provides for introducing a label when deserializing data and suppressing a label when serializing data, as described in detail below. For example, the field "temporary_field_name" can be obtained from the configuration component 360 and introduced to render the following transformation to class "A":

```
class A {
    public BC[ ] temporary_field_name;
}
``` from the above schema, and the following new class "BC":

```
class BC {
    public int B;
    public int C;
}
``` associated with class "A" can be generated.

In yet another aspect of the present invention, the system 300 can be utilized to transform a named construct in object space 350 to a named construct in markup space 340. By way of example, the following exemplary named class "Point":

```
class Point {
    public int x;
    public int y;
}
``` can be received by the mapping component 310, wherein the mapping component 310 can convey the class to the deserializer 330, which can obtain a suitable mapping from the configuration component 360 and employ the mapping to render the following named XSD schema:

```
<element name="Point">
    <complexType>
        <sequence>
            <element name="x" type="int"/>
            <element name="y" type="int"/>
        </sequence>
    </complexType>
</element>
``` in markup space 340, wherein field labels are accordingly transformed.

In still another aspect of the present invention, the system 300 can be utilized to transform an anonymous construct in object space 350 (e.g., with introduced names) to an anonymous construct in markup space 340. The mapping can be utilized in connection with a name(s) in the object space construct that will be suppressed in a markup space representation. By way of example, the following anonymous construct with introduced names:

```
class A {
    public BC[ ] temporary_field_name;
}
``` can be received by the mapping component 310, wherein the mapping component 310 can convey the class to the deserializer 330, which can obtain a suitable mapping from the configuration component 360 and employ the mapping to render the following named XSD schema:

```
<element name="A">
    <complexType>
        <sequence maxOccurs="unbounded">
            <element name="B" type="int"/>
            <element name="C" type="int"/>
        </sequence>
    </complexType>
</element>
``` in markup space 340, wherein the introduce field label "temporary_field_name" is suppressed.

Similar to serialization, deserialization can be isomorphic (as depicted in the above example) or customized to selectively introduce, modify and/or suppress construct structure. For example, the user can specify a desire to modify a name during the transformation from the object domain to the markup domain. By way of example, the user may desire to serialize "Point" in the object construct:

```
class Point {
    public int x;
    public int y;
}
``` to "pair" in the markup construct such that the above renders the following markup construct:

```
<element name="pair">
    <complexType>
        <sequence>
```

-continued

```
            <element name="x" type="int"/>
            <element name="y" type="int"/>
        </sequence>
    </complexType>
</element>
``` with "pair" as the element name.

It is to be appreciated that the above examples are provided for brevity, clarity and explanatory purposes, and do not limit the invention. Thus, although the schema presented in the foregoing examples were depicted as "complex" types, "simple" types can additionally be transformed in accordance with aspect of the invention. In addition, other variously structured markup and object constructs can be utilized in accordance with aspects of the present invention. In addition, it is to be appreciated that the serializer 320 and deserializer 330 can be utilized as or replaced with a persister (not shown) and restorer (not shown) in order to persist objects to relational tables and restore objects from relational tables and/or a publisher (not shown) and shredder (not shown) in order to publish markup in relational tables and/or shred markup from relational tables.

Figure 4:
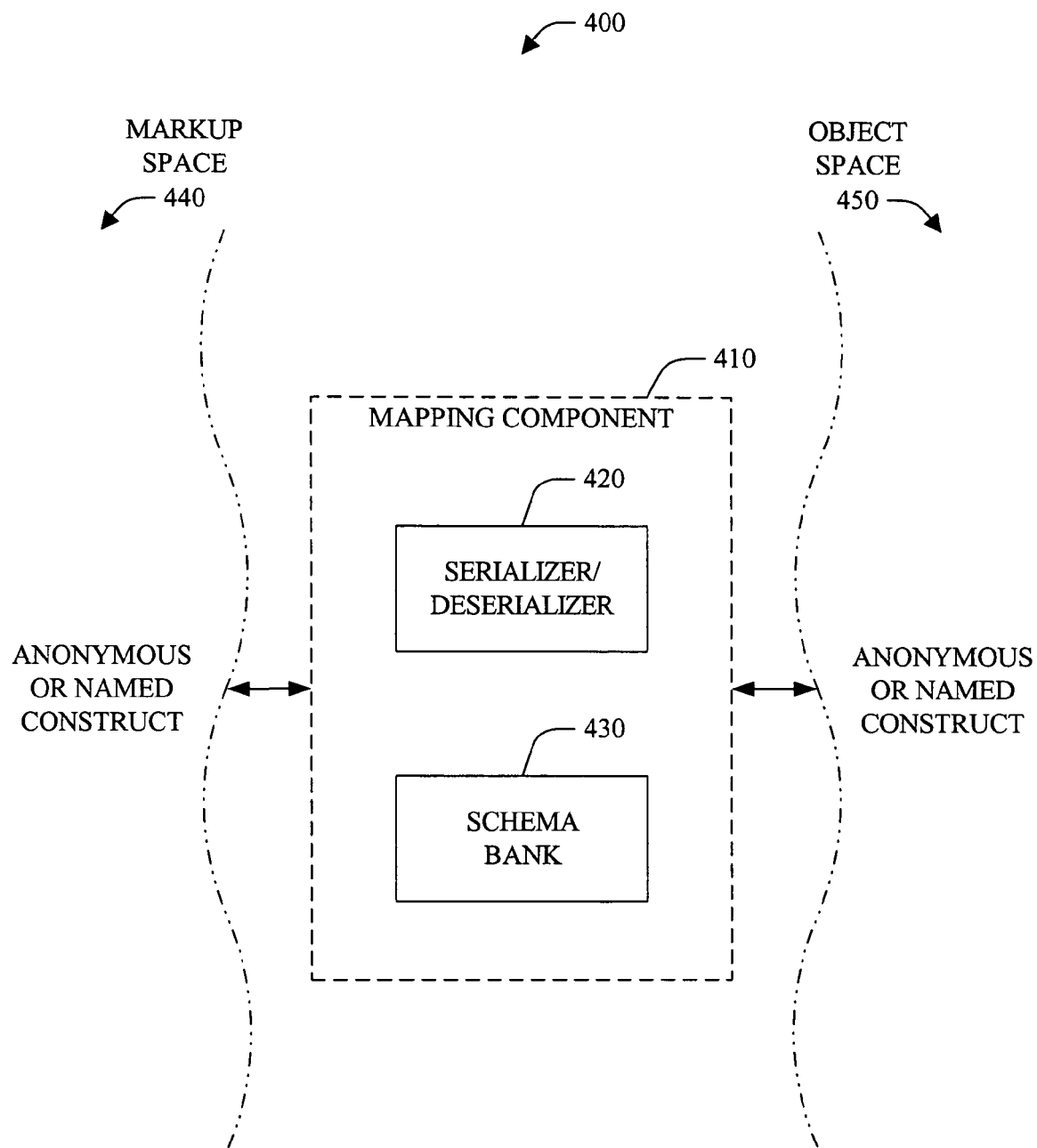
FIG. 4 illustrates an exemplary system that employs mediating schema to transform constructs between markup space and object space.

FIG. 4 illustrates a system 400 that employs a mediating schema to transform constructs. The system 400 comprises a mapping component 410 that includes a serializer/deserializer 420 and a schema bank 430. The serializer/deserializer 420 can operate substantially similar to the serializer 320 and deserializer 330. The schema bank 430 can be utilized to store mediating schema that can be employed to generate an intermediate structure when serializing and/or deserializing constructs. For example, the serializer/deserializer 420 can obtain a mediating schema from the schema bank 430 and employ the mediating schema to map the following schema:

```
<element name="A">
    <complexType>
        <sequence maxOccurs="unbounded">
            <element name="B" type="int"/>
            <element name="C" type="int"/>
        </sequence>
    </complexType>
</element>
``` from a markup space 440 to the following intermediate structure:

```
<element name="A">
    <complexType>
        <sequence>
            <element name="_invisible"
                type="BC"
                    maxOccurs="unbounded">
        </sequence>
    </complexType>
</element>
``` and map the intermediate structure to the following class:

```
class A {
    public BC[ ] temporary_field_name;
}
``` in an object space 450, which corresponds to the original markup schema.

In addition, the mediating schema (e.g., the same or a different mediating schema) can be utilized to generate the following intermediate structure schema:

```
<complexType="BC">
    <sequence maxOccurs="unbounded">
        <element name="B" type="int"/>
        <element name="C" type="int"/>
    </sequence>
</complexType>
``` associated with the above intermediate structure and transform this structure into the following new class:

```
class BC {
    public int B;
    public int C;
}
``` in object space 450. It is to be appreciated that the mediating schema can also be utilized to generate the above intermediate schema from the classes and transform the intermediate schema to the markup space representations.

Figure 5:
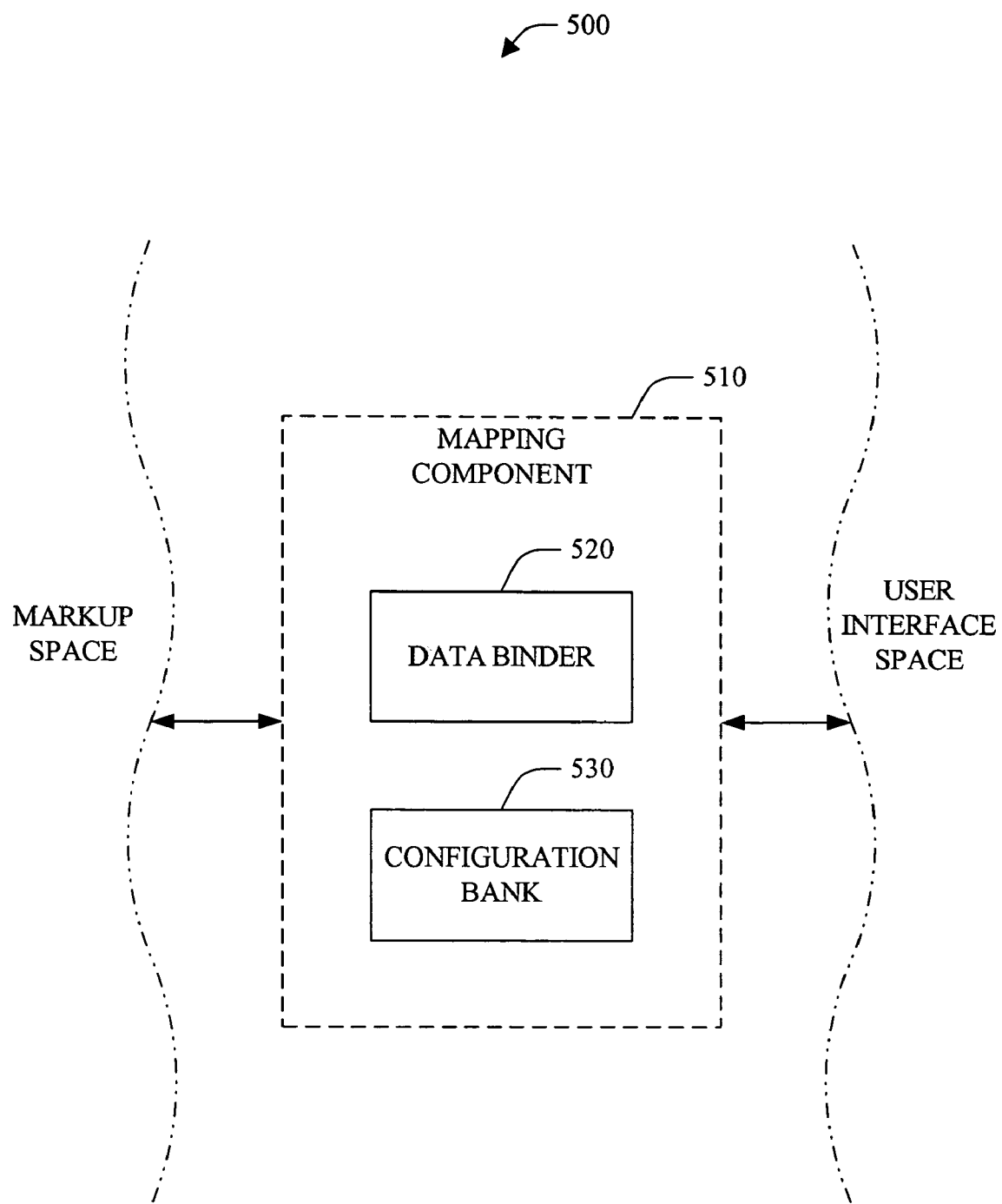
FIG. 5 illustrates an exemplary system that transforms constructs between markup/object and user interface domains.

FIG. 5 illustrates a system 500 that transforms constructs between markup/object space and user interface space. The system 500 comprises a mapping component 510, a data binder 520 and a configuration component 530. The data binder 520 can utilize mapping stored in the configuration component 530 to map. For example, when transforming from markup or object space to user interface space (e.g., an abstract logical table construct), the mapping can define what elements are transformed to corresponding columns of a table and what elements are transformed to corresponding rows of the table. When transforming from user interface space to markup or object space, the mapping can define what table cells are transformed to corresponding elements.

By way of example, the following markup schema:

```
<sequence maxOccurence="unbounded">
    <element name="SS #"/>
    <element name="Name"/>
</sequence>
``` can be provided to the mapping component 510 and conveyed to the data binder 520, and transformed to the following table:

| SS# | Name |
|---|---|
|  |  |
|  |  |
| . |  |
| . |  |
| . |  |
|  |  | in UI space by the data binder 520 via a suitable mapping from the configuration component 530. In addition, the system 500 can be utilized to transform the above table to a markup or object construct by the data binder 520 via a suitable mapping from the configuration component 530.

Figure 6:
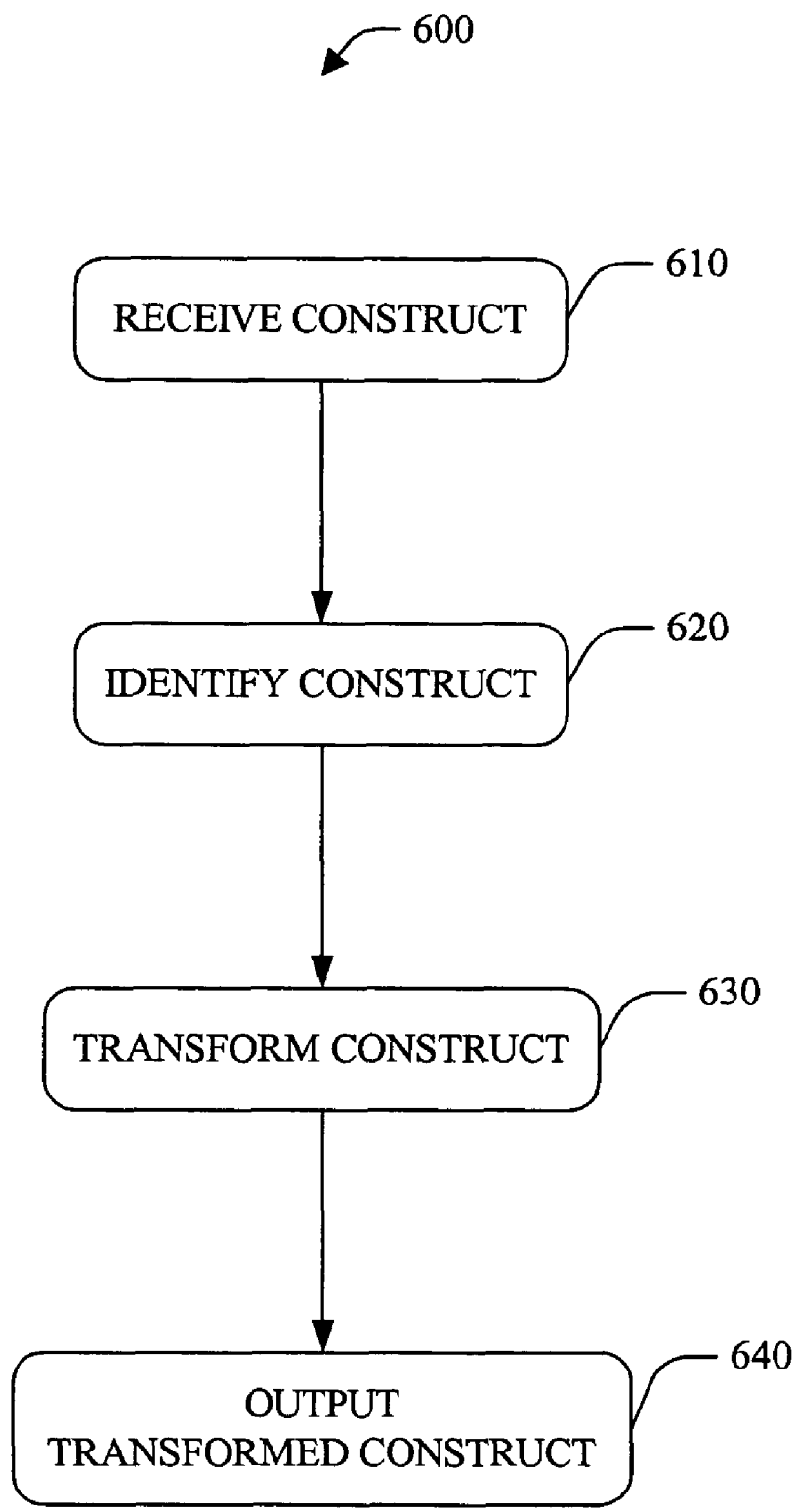
FIG. 6 illustrates an exemplary methodology that transforms constructs via introduce and suppress field labels and mediating schema.
Figure 7:
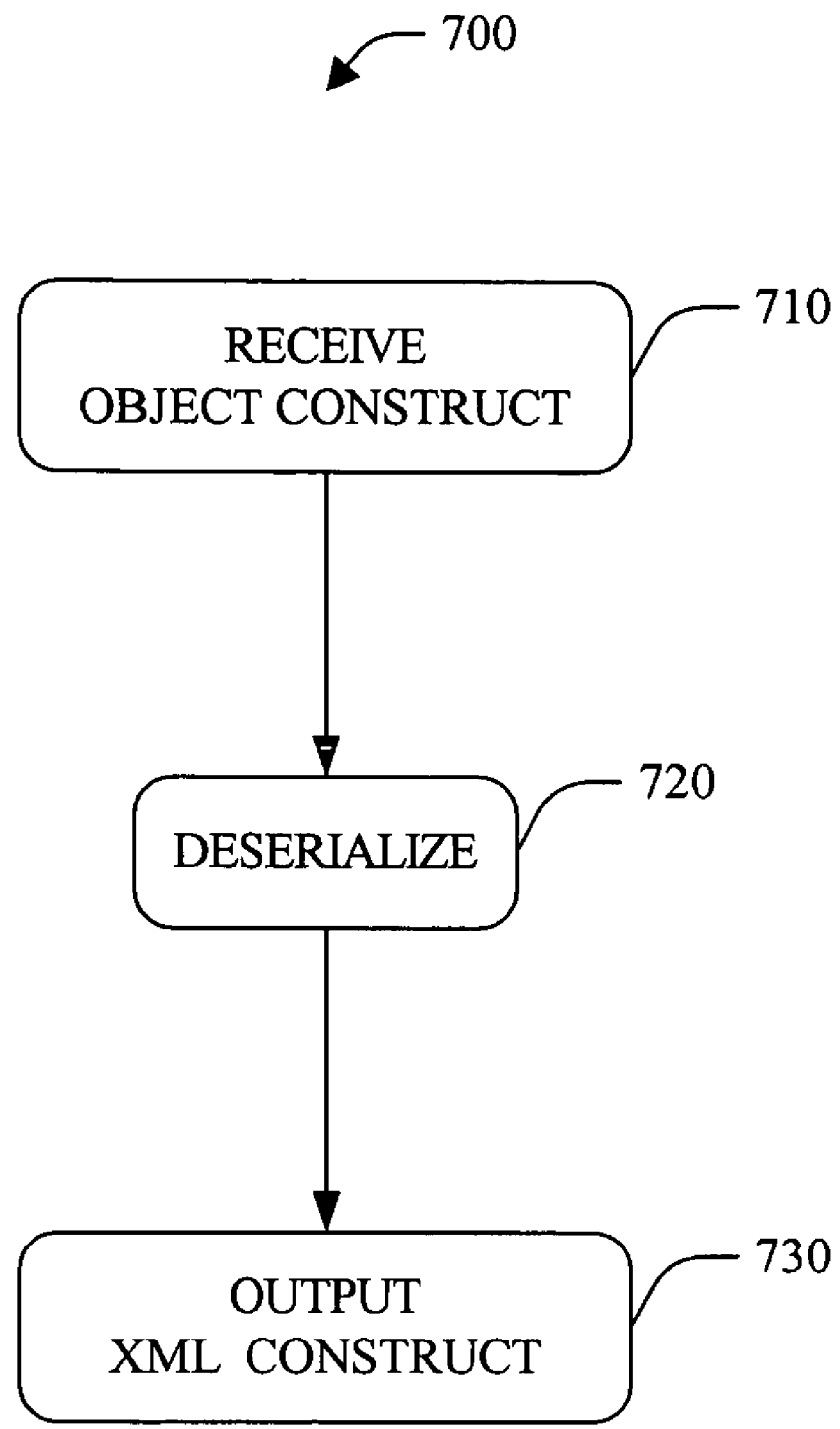
FIG. 7 illustrates an exemplary methodology that deserializes object constructs to XML constructs.
Figure 8:
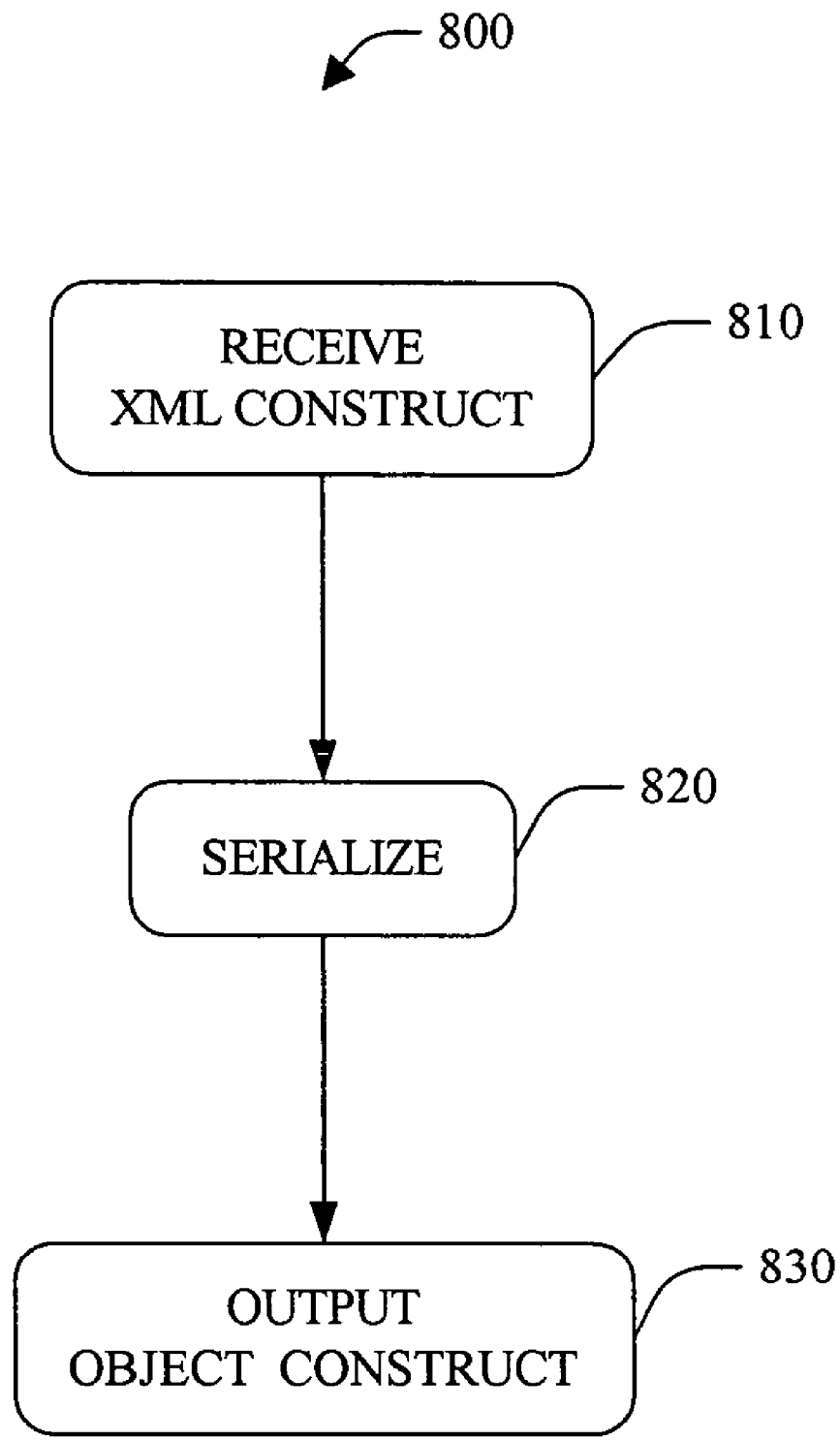
FIG. 8 illustrates an exemplary methodology that serializes XML constructs to object constructs.

FIGS. 6-8 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Proceeding to FIG. 6, a methodology 600 that transforms constructs is illustrated. At reference numeral 610, a construct is received. The construct can be a markup language based construct, an object orientated language based construct or a user interface based construct, for example. In addition, the construct can include all named elements, a combination of named and anonymous elements, all anonymous elements, or at least introduced element name. Such structure can be provided by a user (e.g., via an API) and/or application in order to transform the structure to a particular construct.

At reference numeral 620, the construct can be identified. Such identification can be provided by the user or application, or intelligence can be utilized to determine characteristics, attributes and/or type of construct. In addition, the identification and/or other related information can be utilized to determine a desired representation. Once identified, a suitable mapping can be obtained. Such mapping can include one or more sets of suppress field labels, one or more sets of introduce field labels, and/or mediating schema.

At 630, the mapping can be utilized to transform the construct from one domain to another domain. In addition, transformation can include mapping a named to another named construct, a named construct to an anonymous construct, an anonymous construct to another anonymous construct, and/or an anonymous construct to a named construct. At reference numeral 640, the transformed construct can be output for subsequent utilization.

Next at FIG. 7, a methodology 700 that deserializes constructs is illustrated. At reference numeral 710, an object construct is received. The object construct can be associated with essentially any object oriented language such as C++, C#, Visual Basic, Java and the like. An associated mapping indicating one or more fields to suppress or a mediating schema that defines one or more fields to suppress can be obtained. If desired, one or more introduce field labels and/or a mediating schema with introduce fields can be obtained to introduce fields. At reference numeral 720, the object construct can be deserialized via the mapping to render a markup language based construct (e.g., XML and CLR). For example, any introduced field names can be suppressed in the transformed construct. In another example, user specified field names included in the mediating schema or determined via intelligence can be suppressed in the transformed construct. At reference numeral 730, the markup language based construct is output.

At FIG. 8, a methodology 800 that serializes constructs is illustrated. At reference numeral 810, a markup language based (e.g., XML and CLR) construct is received. An associated mapping indicating one or more field labels to introduce or a mediating schema that defines one or more field labels to introduce can be obtained. If desired, one or more suppress field labels and/or a mediating schema with suppress fields can be obtained to supress fields. At reference numeral 820, the markup language based construct can be serialized via the mapping to render an object oriented language based construct or binded to render a user interface based construct. For example, field labels can be introduced in an object oriented based construct, or elements can be mapped to rows and columns of a table of a user interface based construct. In another example, a customized mapping can be utilized to introduce user specified field labels. At reference numeral 830, the transformed construct is output.

Figure 9:
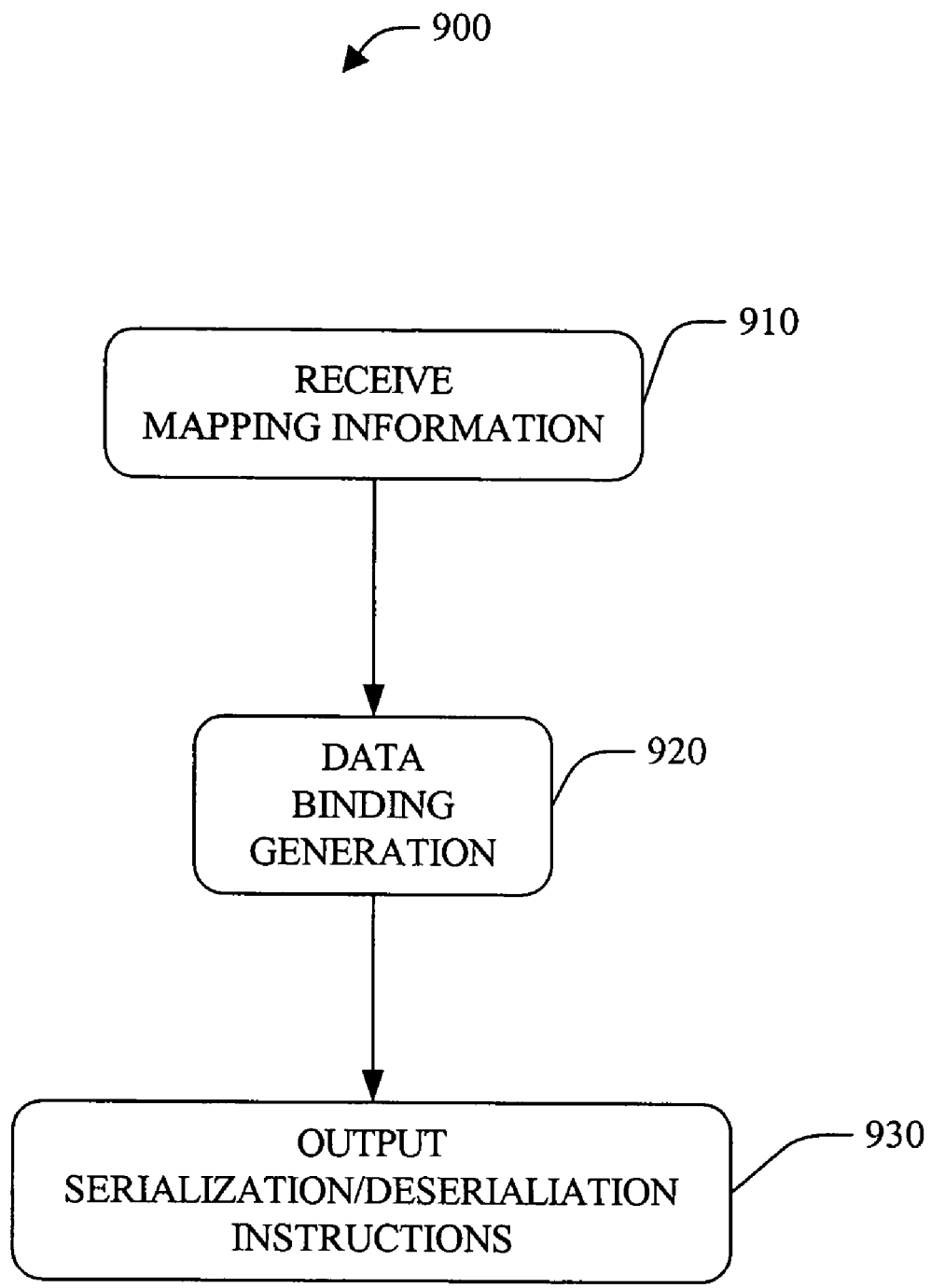
FIG. 9 illustrates an exemplary methodology that generates data binding instructions for transforming constructs.

At FIG. 9, a data binding methodology 900 is illustrated. At reference numeral 910, mapping information is received. For example, a user and/or application can provide the mapping information. In addition, this information can be provided via an API. Moreover, at least a portion of the mapping information can be generated, for example, via intelligence. In general, such information can be associated with classes, schemas, mapping files, etc. At reference numeral 920, the mapping information can be utilized to generate data-binding information. At 930, serialization code, deserialization code, classes, and/or schemas are output. Such output can be utilized to facilitate transformations between constructs, as described in detail herein.

Figure 10:
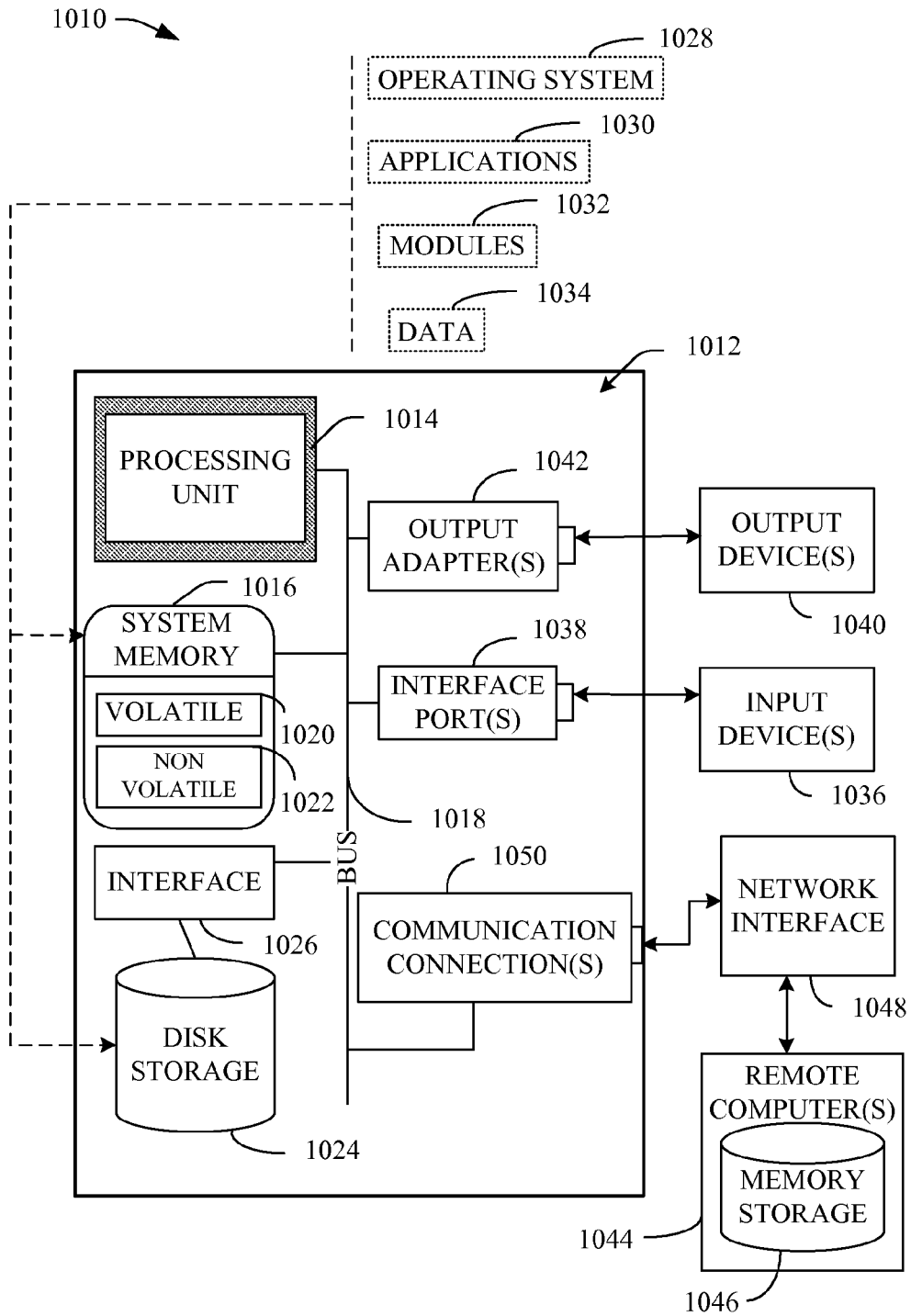
FIG. 10 illustrates an exemplary operating environment, wherein the novel aspects of the present invention can be employed.
Figure 11:
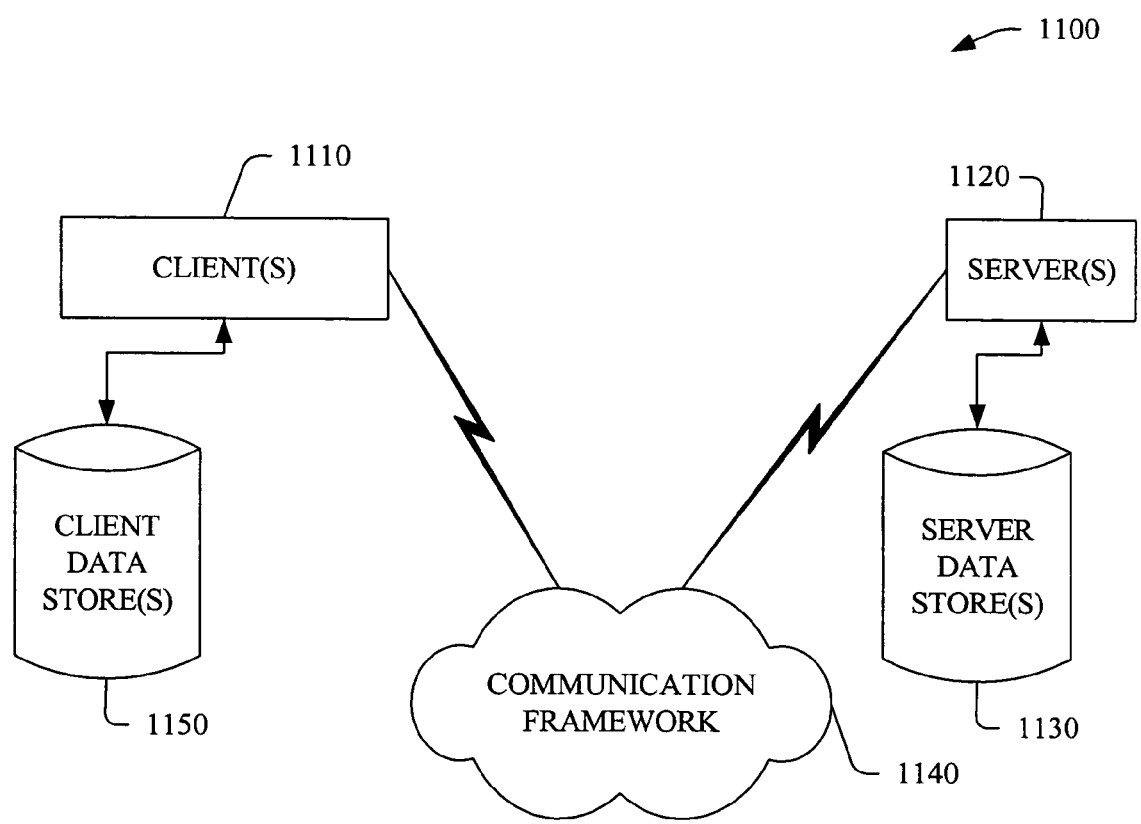
FIG. 11 illustrates an exemplary networking environment, wherein the novel aspects of the present invention can be employed.

In order to provide a context for the various aspects of the invention, FIGS. 10 and 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1120. The server(s) 1120 can also be hardware and/or software (e.g., threads, processes, computing devices). The servers 1120 can house threads to perform transformations by employing the present invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes" and variants thereof are utilized in either the detailed description or the claims, these terms are intended to be inclusive similar to the "comprising."

What is claimed is:

1. A system that maps an anonymous first construct of a markup language domain to a second construct of an object oriented language domain comprising a computer-readable storage medium, comprising the following computer-executable components:
    a bank that stores a set of introduce field labels identifying object oriented language constructs that are created to represent anonymous markup language constructs when the anonymous markup language constructs are deserialized into the object oriented language constructs, and a set of suppress field labels identifying the introduce field labels that are to be removed during serialization of the object oriented language constructs to the anonymous markup language constructs; and
    a mapping component that, during deserialization of a markup language document that contains an anonymous first construct, maps the anonymous first construct of the markup language document to a named second construct in an object oriented language domain by assigning one of the introduce field labels in the bank to represent the anonymous first construct in the object domain, and that, during subsequent serialization of the named second construct in the object oriented language domain to a markup language document in the markup language domain, removes the introduce field label to create the anonymous first construct in the serialized markup language document in the markup language domain.

2. The system of claim 1, wherein the anonymous first construct is a sequence field having an unbounded occurrence constraint.

3. The system of claim 2, wherein the second construct comprises a first class having a nested class as a member that is assigned the introduce field label as a name.

4. The system of claim 1, wherein the markup language domain is one of XML or CLR, and the object oriented language domain is one of C++, C#, Java, or Visual Basic.

5. The system of claim 1, further comprising a mapping file that provides one or more of a default mapping, a user customized mapping, and a mediating schema that facilitates mapping the first construct to the second construct.

6. The system of claim 5, wherein the user customized mapping defines a construct structure to suppress and introduce labels.

7. The system of claim 5, wherein the user customized mapping comprises at least one of an annotating type and an annotating schema.

8. The system of claim 5, wherein the default mapping is based on one or more of a heuristic, an inference, or a probability and machine learning.

9. The system of claim 5, wherein the mediating schema transforms constructs to an intermediate representation at least one of before, during and after transforming the first construct.

10. A method that transforms constructs between a markup language domain and an object oriented language domain, comprising:
    storing, in a bank, a set of introduce field labels for identifying object oriented language constructs that are created to represent anonymous markup language constructs when the anonymous markup language constructs are deserialized into the object oriented language constructs, and a set of suppress field labels for identifying the introduce field labels that are to be removed during serialization of the object oriented language constructs to the anonymous markup language constructs;
    receiving a markup language document that includes an anonymous first construct of the markup language domain;
    mapping, during deserialization of the markup language document, the anonymous first construct of the markup language document to a named second construct in the object oriented language domain by assigning one of the introduce field labels in the bank to represent the anonymous first construct in the object domain; and
    removing, during serialization of the named second construct in the object oriented language domain to a markup language document in the markup language domain, the introduce field label to create the anonymous first construct in the serialized markup language document in the markup language domain.

11. The method of claim 10, wherein the anonymous first construct is a sequence field having an unbounded occurrence constraint, and wherein the second construct comprises a first class having a nested class as a member that is assigned the introduce field label as a name.

12. The method of claim 10, wherein the transformation is lossless.

13. The method of claim 10, wherein the mapping is based on one or more of a heuristic, an inference, a probability and machine learning.

14. The method of claim 10, wherein the anonymous first construct is converted to the second construct using a mediating schema.

15. The method of claim 14, wherein the mediating schema transforms the anonymous first construct to an intermediate representation and then converts the intermediate representation to the second construct.

16. A computer-readable storage medium storing computer executable instructions which when executed by a processor perform a method that transforms constructs between a markup language domain and an object oriented language domain, comprising:
    storing, in a bank, a set of introduce field labels for identifying object oriented language constructs that are created to represent anonymous markup language constructs when the anonymous markup language constructs are deserialized into the object oriented language constructs, and a set of suppress field labels for identifying the introduce field labels that are to be removed during serialization of the object oriented language constructs to the anonymous markup language constructs;

receiving a markup language document that includes an anonymous first construct of the markup language domain;

mapping, during deserialization of the markup language document, the anonymous first construct of the markup language document to a named second construct in the object oriented language domain by assigning one of the introduce field labels in the bank to represent the anonymous first construct in the object domain; and removing, during serialization of the named second construct in the object oriented language domain to a markup language document in the markup language domain, the introduce field label to create the anonymous first construct in the serialized markup language document in the markup language domain.

* * * * *